(No Model.) 3 Sheets—Sheet 1.
M. BROCKWAY, C. N. WATTS & P. SHELDON.
AIR BRAKE FOR RAILWAY CARS.
No. 264,617. Patented Sept. 19, 1882.
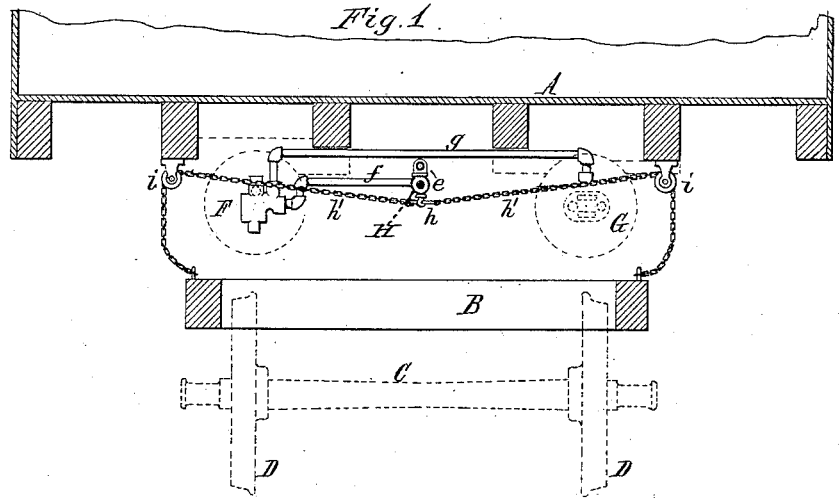
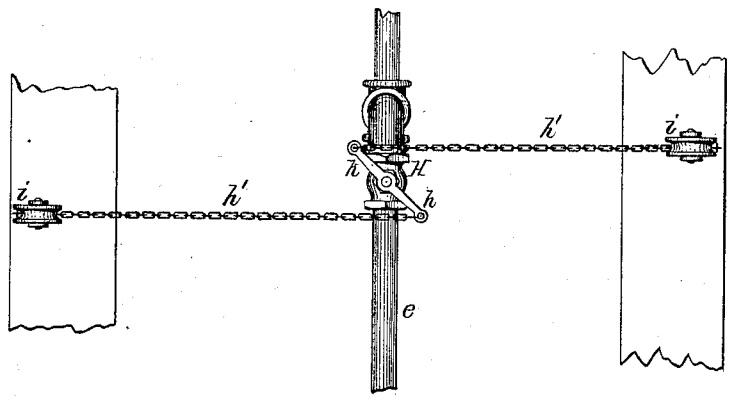
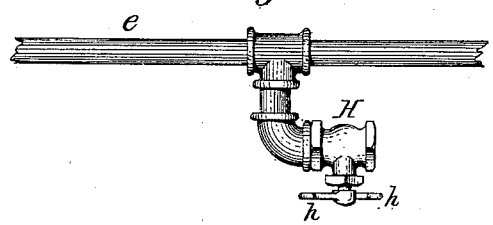
Witnesses.
Edw. J. Brady.
Theo. L. Popp.
M. Brockway
Chas. N. Watts
Porter Sheldon Inventors.
By Wilhelm Bonner
Attorneys.

(No Model.) 3 Sheets—Sheet 2.
M. BROCKWAY, C. N. WATTS & P. SHELDON.
AIR BRAKE FOR RAILWAY CARS.
No. 264,617. Patented Sept. 19, 1882.
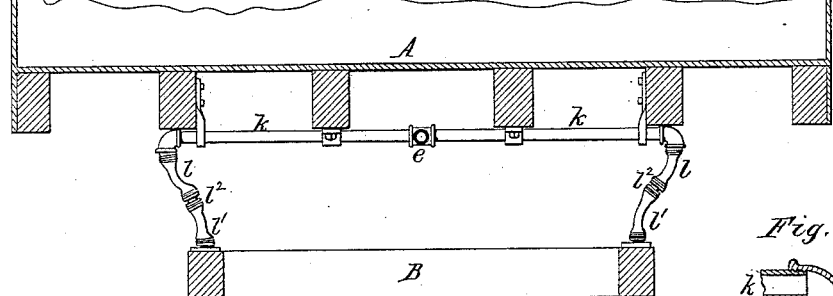
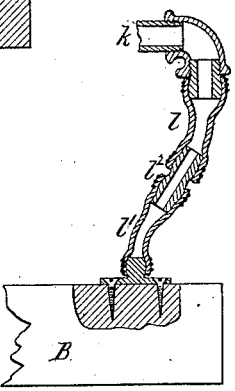
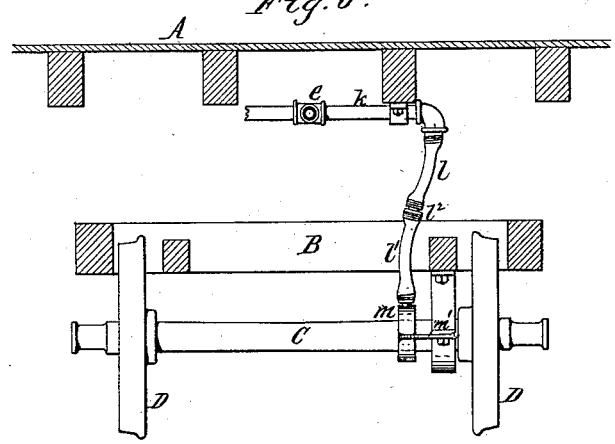
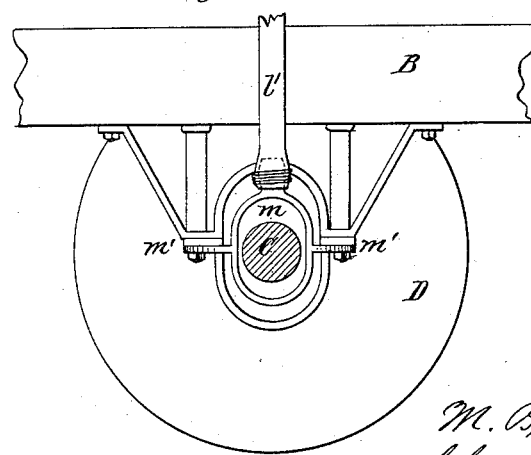
Witnesses:
Edw. J. Brady.
Theo. L. Popp.
M. Brockway
Chas. N. Watts
Porter Sheldon Inventors.
By Wilhelm & Bonner
Attorneys.

(No Model.) 3 Sheets—Sheet 3.

M. BROCKWAY, C. N. WATTS & P. SHELDON.
AIR BRAKE FOR RAILWAY CARS.

No. 264,617. Patented Sept. 19, 1882.

UNITED STATES PATENT OFFICE.

MARCUS BROCKWAY, CHARLES N. WATTS, AND PORTER SHELDON, OF JAMESTOWN, NEW YORK.

AIR-BRAKE FOR RAILWAY-CARS.

SPECIFICATION forming part of Letters Patent No. 264,617, dated September 19, 1882.

Application filed June 24, 1882. (No model.)

*To all whom it may concern:*

Be it known that we, MARCUS BROCKWAY, CHARLES N. WATTS, and PORTER SHELDON, all of Jamestown, in the county of Chautauqua and State of New York, have invented new and useful Improvements in Air-Brakes for Railway-Cars, of which the following is a specification.

Our invention relates to an improvement in air-brakes for railway-cars whereby the brakes are applied when a truck or the running-gear of a car assumes an abnormal position with reference to the car-body—as, for instance, when one or more wheels leave the rails.

Our invention has reference more particularly to an improvement in that class of airbrakes in which the brake mechanism is operated so as to apply the brakes when the air-pressure in the air-supply pipe is reduced by the escape of the compressed air.

Our invention consists in connecting the air-supply pipe with the trucks or running-gear of the cars in such manner that the compressed air is automatically permitted to escape from said pipe when any truck or running-gear assumes an improper position by the wheels leaving the track, or from any other cause, thereby applying the brakes of the whole train automatically as soon as this happens.

In the accompanying drawings, consisting of three sheets, a number of different mechanisms are represented whereby our invention can be carried into effect.

Figure 8:
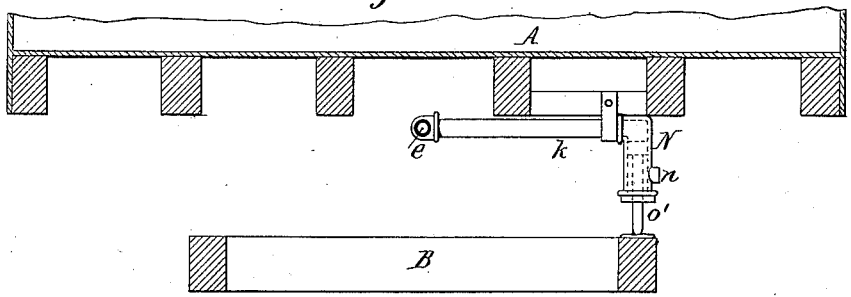
Figure 9:
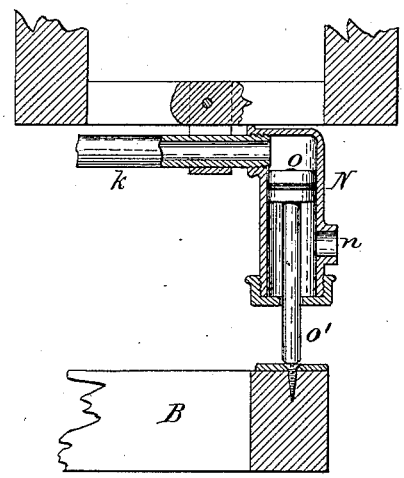
Figure 10:
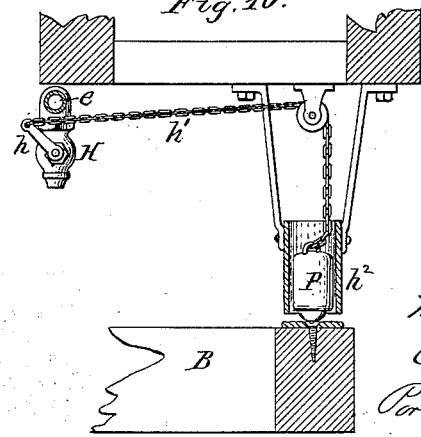

Figure 1 represents a cross-section of the lower portion of a railway-car provided with our improvement. Fig. 2 is a bottom plan view of our improvement, and Fig. 3 a fragmentary side elevation thereof. Fig. 4 represents a cross-section showing a modified construction of our device. Fig. 5 is a sectional elevation, on an enlarged scale, of one of the end portions of the air-pipe employed in the device represented in Fig. 4. Fig. 6 is a cross-section showing a modification of the device represented in Fig. 4. Fig. 7 is a fragmentary side elevation thereof. Fig. 8 is a cross-section showing another modified construction of our improved mechanism. Fig. 9 is a sectional elevation thereof on an enlarged scale. Fig. 10 is a cross-section of another modification of our mechanism.

Like letters of reference refer to like parts in the several figures.

A represents the floor of a railway-car; B, the truck, connected therewith in any suitable and well-known manner; C, one of the axles on which the truck-frame is mounted, and D D, the wheels secured to said axles.

$e$ represents the brake-pipe through which the compressed air is conducted from the compressing mechanism on the locomotive to the different cars, and which is secured to the under side of the car-floor in the usual manner.

$f$ represents a lateral branch pipe, conducting the air from the pipe $e$ to the auxiliary air-reservoir F, secured to the under side of the car-floor, and $g$ represents the pipe through which the compressed air is conducted from the reservoir F to the brake-cylinder G when the air-pressure in the pipe $e$ is reduced. These air pipes and vessels are constructed in any suitable and well-known manner, and provided with the well-known valves and other devices whereby the flow of the air through these pipes and vessels is regulated in the usual and well-known manner.

In Figs. 1, 2, and 3, H represents a stop-cock, communicating with the brake-pipe $e$ and opening into the external air. The plug of the stop-cock is provided with two arms, $h$, the ends of which are connected by chains or ropes $h'$ to both sides of the truck B. These chains run over pulleys $i$, secured to the under side of the car-floor, and are sufficiently slack to permit the ordinary vibrations of the truck without moving the plug of the cock H. If, however, the truck should assume such a position with reference to the car-body that either of its sides is depressed more than usual—as, for instance, when a wheel leaves the track, or if the truck becomes displaced horizontally by slewing around or otherwise—one or both of the chains $h'$ will be drawn down, whereby the cock H is opened and the air in the brake-pipe $e$ permitted to escape, and the brakes are applied at the moment the truck assumes such improper position.

In the construction represented in Figs. 4, 5, 6, and 7 the brake-pipe e is provided with two lateral branches, k, each terminating in a flexible pipe composed of two sections, l l', connected by a detachable coupling, l². The section l of the elastic pipe is firmly attached to the end of the branch pipe k and the section l' is firmly attached to the truck B, as represented in Figs. 4 and 5, or to the axle C by means of an elongated ring or loop, m, surrounding the axle, as represented in Figs. 6 and 7. When the parts are in their normal position, as represented in the figures, the ends of the branch pipes k are closed by the flexible pipes l l', which permit the ordinary vibrations of the truck and running-gear, and the brake mechanism operates in the usual manner. When, however, the truck or the axle descends on either side more than usual, or when the truck is displaced horizontally, the improper position of the truck or running-gear causes the coupling l² to part, thereby permitting the compressed air to escape from the pipe e and applying the brakes. The ring m is connected with the truck-frame by bars m', which hold the ring in its proper position under ordinary circumstances, so as to permit the axle to rise and fall in the ordinary vibrations of the running-gear; but the bars m are of such slight construction as to give way under an extraordinary strain from the axle, when the axle will move the ring downward, so as to disconnect the flexible pipes l l'.

In the construction shown in Figs. 8 and 9 the end of the branch pipe k is provided at its end with a vertical cylinder, N, having a lateral discharge-opening, n, near its lower end, and in which works a piston, O, which is supported upon the truck-frame above the opening n by means of a downwardly-extending piston-rod, o', resting with its lower end on the truck-frame. The piston-rod rests on the truck-frame just inside the corner thereof, so that when the frame slews around the end of the piston-rod is deprived of its support by the frame passing from under it. When the parts are in their normal position, as represented in Figs. 8 and 9, the piston O prevents the compressed air contained in the brake-pipe e and branch k from escaping through the opening n, and the brake mechanism works in the usual manner. The piston O moves up and down in the cylinder N as the truck vibrates, but does not descend far enough in the ordinary vibrations of the truck to establish communication between the opening n and the branch pipe k. When, however, the truck drops more than usual, or slews around, the piston O descends below the opening n, whereby the air in the brake-pipe is permitted to escape, thereby applying the brakes.

In the construction represented in Fig. 10 the stop-cock H, with which the brake-pipe is provided, is operated by means of a weight, P, which rests upon the truck-frame, and which is connected with the arms h of the stop-cock by a chain or rope, h', in such manner that in the ordinary vibrations of the truck the stop-cock will remain closed; but when the truck descends or slews around more than usual the weight P, on descending with the truck, or on the truck-frame passing out from under it in falling, will draw on the chain h' and open the stop-cock, thereby permitting the air to escape from the pipe e and applying the brakes. h² represents a casing which incloses the weight P when resting in its normal position on the truck-frame, and which prevents its moving laterally.

We claim as our invention—

The combination, in a railway-car, of a brake-pipe supplying compressed air to the brake mechanism, an escape-opening whereby the compressed air can escape from said brake-pipe, and mechanism connected with the truck or running-gear whereby the escape-opening is closed and the escape of the air prevented when the trucks or running-gear are in their normal position and opened when the trucks or running-gear assume an improper position, thereby permitting the air to escape from said pipe and applying the brakes.

MARCUS BROCKWAY.
CHAS. N. WATTS.
PORTER SHELDON.

Witnesses:
ADDIE M. BROCKWAY,
H. R. LEWIS.